Figure 3:
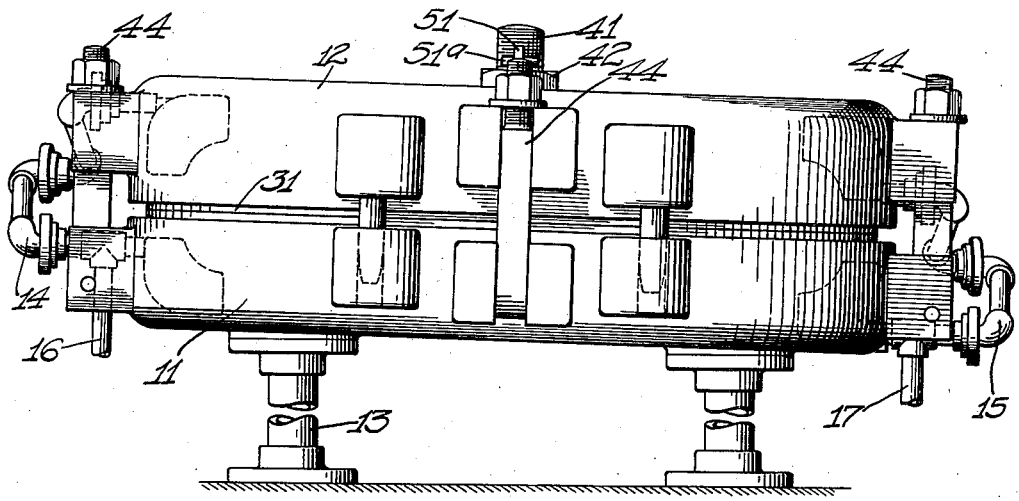

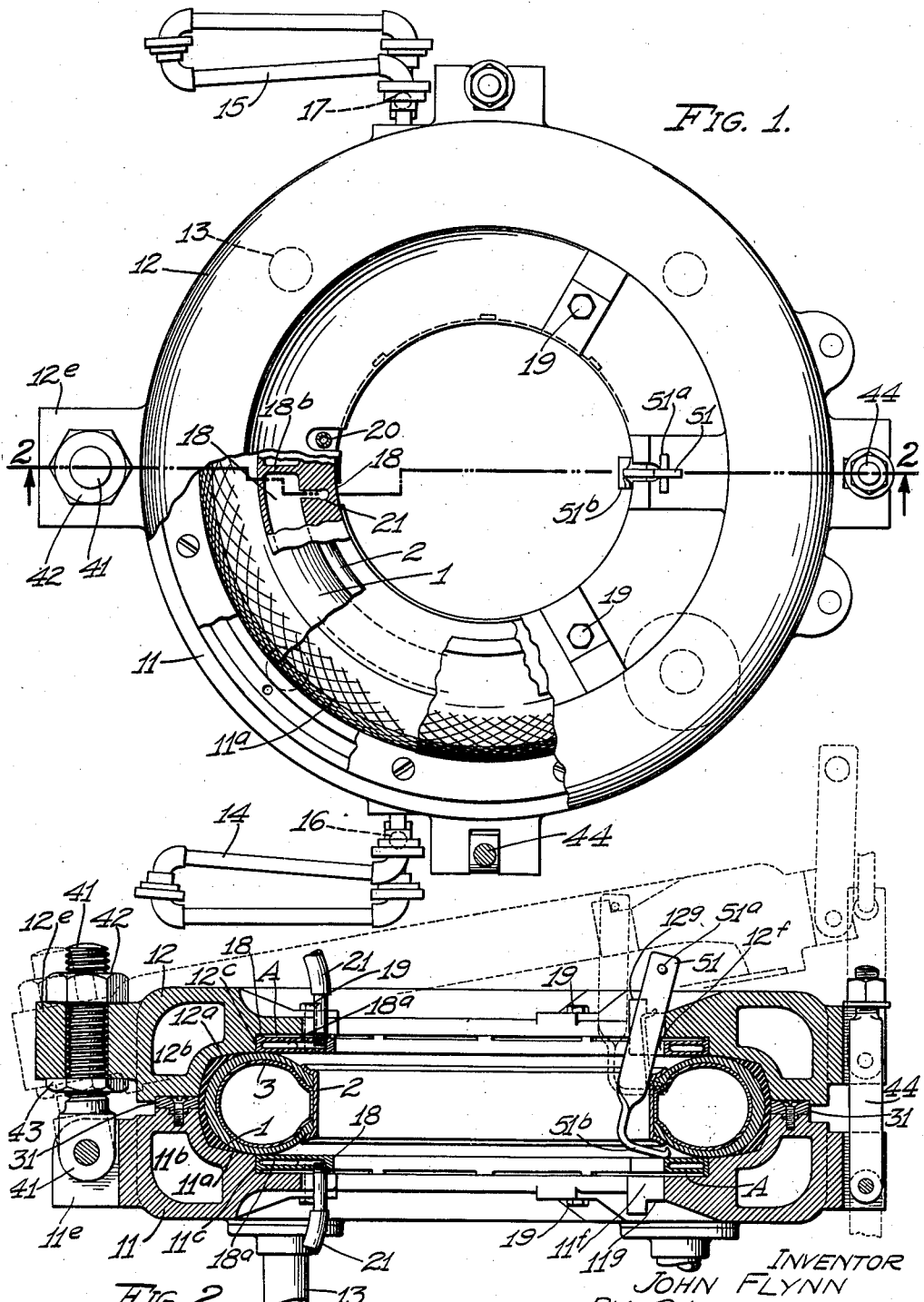

Nov. 5, 1935.  J. FLYNN  2,020,023

TIRE RETREADING AND REMOLDING APPARATUS

Filed Aug. 9, 1933   2 Sheets-Sheet 2

INVENTOR
JOHN FLYNN
BY
ATTORNEY.

UNITED STATES PATENT OFFICE 2,020,023

TIRE RETREADING AND REMOLDING APPARATUS

John Flynn, Los Angeles, Calif., assignor to Flynn and Collins, Los Angeles, Calif., a partnership consisting of J. E. Collins and John Flynn Application August 9, 1933, Serial No. 684,322

5 Claims. (Cl. 18—18)

My invention relates to tire retreading, recapping and remolding apparatus, and a combination of the two former with the latter.

With the customary process of retreading or curing the tread portion only of the tire, the portion inwardly thereof, or at the sides of the tire, is double-cured or over-cured, checked, cracked, distorted or discolored. Also with pressure from within, which forces the casing against the hot mold, pronounced ridges or sharp rings are formed at the radially inner portion of the casing, which present not only an unsightly appearance but weaken the casing.

An object of my invention is to provide an apparatus of this class which will avoid or correct the above enumerated defects in apparatus formerly in use, by curing the tread portion or the new portion added and at the same time keeping cool the side of the tire.

Another object of my invention is to provide a simple means for circulating cooling water against the side of the tire not intended to be cured or heated, and further to provide simple means for insulating the heating means from the cooling means.

Another object of my invention is to provide a combination apparatus wherein certain elements may be easily interchanged so that the apparatus may be used only for retreading or recapping tires, or whereby tires may be wholly remolded.

Still another object is to provide an apparatus of this class whereby tires of different sizes, that is, of different diameters and cross sections, may be retreaded, recapped, or remolded by inserting merely a spacing ring at the central portion of the periphery, or such a ring and a spacing collar at the radially inner portion of the apparatus.

A further object of this invention is to provide a hinge for pivoting the opposite halves of the apparatus, and which is so constructed that when the upper or front part is separated from the other part, the former is shifted clear of the latter, and further constructed so as to be adjusted to accommodate the pivoted parts of the apparatus whether or not spacing rings are used, or when spacing rings of various thicknesses are used.

A still further object of my invention is to provide a novel and simple means in connection with the separable members of the apparatus for removing or loosening the molded tire from the molding member to which it may adhere.

A final object of my invention is to provide an apparatus of this class which is simple and economical of construction, durable, and which will not readily deteriorate or get out of order.

Figure 4:
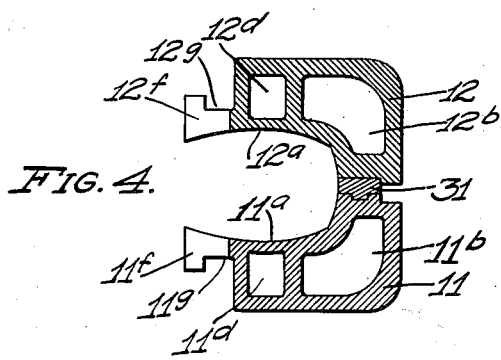
Figure 5:
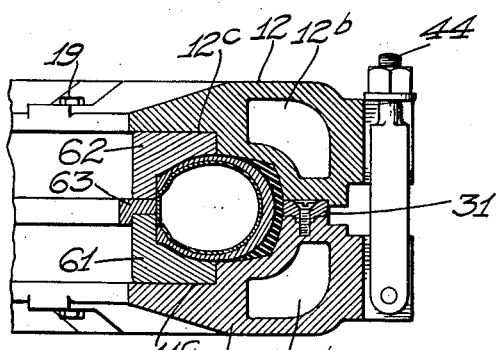

With these and other objects in view, as will appear hereinafter, I have devised an apparatus for performing the above functions and one having certain novel features of construction, combination, and arrangement of parts and portions, as will be hereinafter described in detail and particularly set forth in the appended claims, reference being had to the accompanying drawings, and the characters of reference thereon, in which:

Fig. 1 is a plan view of my apparatus in its preferred form of construction, portions thereof being shown broken away and in section to facilitate the illustration; Fig. 2 is a fragmentary sectional elevational view thereof, taken through 2—2 of Fig. 1, and showing, by dotted lines, the upper mold member in a slightly raised position, and also a means for raising the same; Fig. 3 is a front elevational view thereof; Fig. 4 is a fragmentary sectional view of my apparatus in a slightly modified form of construction; and Fig. 5 is a fragmentary sectional view showing my apparatus constructed or arranged for remolding tires.

In the drawings, like characters of reference refer to similar parts and portions throughout the several views of the drawings.

My apparatus, as shown in the drawings, comprises a pair of annular mold members 11 and 12, which encase substantially the opposite halves or sides of a tire. These members are placed side by side and arranged substantially horizontally. The lower member 11 is supported above the floor on legs 13, while the member 12 is hinged at one side on the member 11, as will be described hereinafter.

These mold members are provided at their adjacent sides and radially inner portions with large annular openings 11ª and 12ª, respectively, which, when the mold members are placed side by side against each other, form an annular void for the reception of a tire casing 1. The walls of the mold members forming the peripheral walls and the adjacent side walls of the void are provided with the engraving or tread design desired on the tire.

In the art of retreading or recapping of worn tire casings, the worn portion of the tread is cut down and buffed, and a new tread portion of raw gum rubber is cemented on the casing or carcass. An airbag or bladder 3 is placed inside of the casing 1 of the tire, and the whole (that is when retreading only) is mounted on a rim 2, which is similar to the conventional tire rim. The carcass or casing so mounted is placed in the void between the two mold members, which are then secured together. The airbag is then blown up forcing the tread against the engraved portions of the walls of the mold members.

In each mold member is a circular passage, designated 11$^b$ and 12$^b$, which extends preferably completely around each member for conducting steam or other hot fluid therethrough and heating the wall forming the void. The heating fluid inlet and outlet connections are at approximately diametrically opposite sides of the members and at the opposite sides of the hinge connection, and, when steam is used, the outlet is lower than the inlet. The inlet and the outlet of the upper member 12 are connected with the inlet and the outlet of the lower member 11 by pairs of universally connected pipe sections 14 and 15, while the steam supply and exhaust conductors 16 and 17, respectively, are directly connected to the lower mold member 11.

The sides of the tire immediately beyond and radially inwardly from the molded retread portion are kept cool, or below the temperature of the curing or deterioration of rubber, by cooling plates 18 which are relatively flat annular members secured by screws 19 in recesses 11$^c$ and 12$^c$ at the radially inner portions of the members 11 and 12, and form substantially inward extensions of the opposite lateral sides of the tire receiving void. These cooling plates are provided with annular or arcuate passages 18$^a$ for the circulation of cooling water or other fluid for cooling the inner walls of these plates. This passage is provided with a partition 18$^b$ and is connected at the opposite sides thereof to water supply and discharge conductors 20 and 21, which are preferably at the hinge side of these members. These plates are also insulated from the adjacent walls of the molding members preferably by an air space designated A, which communicates freely at its radially inner portion with the atmosphere.

It will be noted that either the circulating water passage or the air space may be omitted, but better results are obtained by preventing, or reducing to a minimum, the direct conduction of heat to the plates.

In Fig. 4 of the drawings, I have shown a modified form of construction by providing cooling water passages 11$^d$ and 12$^d$ directly in the mold members, whereby the air passage or insulating means is eliminated.

The apparatus described above is adapted to receive tires of slightly different sizes, that is, of different diameters and cross sections; but to provide greater capacity, I have provided spacing rings 31, of different thicknesses. These rings fit into and are secured to the face of one of the mold members. The faces of the mold members are interlocking or alining, and the spacing rings include this feature. The radially inner edges of the rings form the central portion of the mold or matrix and increase the size of the mold so that tires of both larger diameter and larger cross section may be molded therein.

The hinge of my apparatus consists of a bolt 41 and nuts 42 and 43. The bolt is pivoted on lugs 11$^e$ on an axis parallel to but downwardly from the median plane of the mold or the engaging faces of the mold members. By such pivoted connection, the upper mold member is raised and shifted backwardly when the mold members are separated. The shank portion of the hinge bolt is threaded and extends freely through a hole in a lug 12$^e$ on the member 12 but is adjustably secured to the lug by the nuts 42 and 43 which engage the upper and lower sides of the lug. This adjustment of the bolt accommodates the hinge to spacing rings of different thicknesses.

The mold members are secured together by the hinge bolt as well as by a plurality of other bolts 44 which may be also pivoted on the lower mold member, as shown.

When molding the tire, the same adheres to the mold members, and when the mold members are separated the molded tire sticks tightly to one of them. To facilitate the ready loosening or removal of the tire therefrom, I have provided a simple link, in the form of a hook 51, for loosely but positively connecting the tire with the mold member from which it is already loosened. This hook consists of a shank at one end of which is a cross pin or other enlargement, 51$^a$, and at the other end a hook 51$^b$. Each mold member is provided with a radial slot 11$^f$ and 12$^f$ at the radially inner side and diametrically opposite the hinge, for receiving the shank. These members are also provided with slots or outwardly extending portions 11$^g$ and 12$^g$, transverse to the slots 11$^f$ and 12$^f$, for receiving the cross pin and holding the outer end of the hook while hook portion 51$^b$ engages the far side of the tire rim 2. The hook inserted in the slot of the mold member which is free from the tire so that the tire is separated from the other mold member when the mold members are separated.

When remolding a tire, that is, when retreading as well as remolding the whole lateral sides, the cooling plates are removed and in their place are secured, by the same means, annular curing members 61 and 62 which conform substantially to the shape of the radially inner portions of the tire. These curing members extend towards each other around the inner bead side of the tire, and engage each other except when spacing rings are used. In the latter event, annular spacing collars 63, of the same thickness as the rings are inserted between the adjacent sides of the collars.

When remolding tires, several coats of rubber cement or a sheet of rubber is applied to the sides of the tire inwardly from the tread portion.

Though I have shown and described a particular construction, combination, and arrangement of parts and portions and certain modifications thereof, I do not wish to be limited to this particular construction, combination, and arrangement, nor to the modifications, but desire to include in the scope of my invention the construction, combination, and arrangement substantially as set forth in the appended claims.

I claim:

1. In a tire retread apparatus, a pair of annular mold members removably positioned together and provided therebetween and at radially inner portions thereof with an annular void for receiving a tire and molding the opposite halves of the peripheral and side portions of the tread of the tire, said members having arcuate passages at the radially outer portions for conducting a heating fluid therethrough and heating the peripheral walls forming the void, and a pair of circular cooling plates, one secured with its laterally outer side against and to each of said members in such a manner so as to form the radially inner portions of said void, said plates having arcuate passages therein for circulating water, there being provided an air space between the laterally outer sides of said plates and said members.

2. In a tire retread apparatus, a pair of annular mold members removably positioned together and provided therebetween and at radially inner portions thereof with an annular void for receiving a tire and molding the opposite halves of the peripheral and side portions of the tread of the tire, said members having arcuate passages at the radially outer portions for conducting a heating fluid therethrough and heating the peripheral walls forming the void, each of said members having at the radially inner portions of the opposite lateral portions thereof, annular recesses, and annular cooling and molding members removably and interchangeably securable in said recesses for cooling or molding the radially inner portions of the lateral sides of said tire.

3. In a tire retread apparatus, a pair of annular mold members removably positioned together and provided therebetween and at radially inner portions thereof with an annular void for receiving a tire and molding the opposite halves of the peripheral and side portions of the tread of the tire, said members having arcuate passages at the radially outer portions for conducting heating fluid therethrough and heating the peripheral walls forming said void, each of said members having at the radially inner portions of the opposite lateral portions thereof annular recesses, annular plates removably securable in said recesses for engaging radially inner portions of the lateral sides of said tire and constructed to circulate a cooling fluid for cooling the portion of the tire engaged thereby, and annular molding members removably securable in said recesses when said plates are removed for molding the inner radial portions of the lateral sides of said tire.

4. In a tire retread apparatus, a pair of annular mold members removably positioned together and provided therebetween and at the radially inner portions thereof with an annular void for receiving a tire and molding the peripheral portions thereof, a rim positioned between said members at the radially inner portions thereof to facilitate the positioning of said tire with respect to the mold members, said members having radial slots at their radial inner portions opposite said rim, and a hook positioned with its shank in one of said slots and provided on the outer end of said shank with means to prevent withdrawal of the shank through said slot, and provided at its oppositely positioned end with a hook for positively engaging the opposite side of said rim when separating said members.

5. In a tire retread apparatus, a pair of annular mold members removably positioned together and provided therebetween and at radially inner portions thereof with an annular void for receiving a tire and molding the opposite halves of the peripheral and side portions of the tread of the tire, said members having arcuate passages at the radially outer portions for conducting a heating fluid therethrough and heating the peripheral walls forming the void, said members having circulating cooling liquid passage means at the lateral outer sides of the walls forming the radially inner portions of the void, said members being also provided with air spaces between the lateral outer sides of the said cooling liquid passage means and the main portions of said members.

JOHN FLYNN.